(12) United States Patent
Deslandes

(10) Patent No.: US 8,248,407 B2
(45) Date of Patent: Aug. 21, 2012

(54) SYSTEM AND METHOD OF COMPUTER-AIDED DESIGN OF A 3D OBJECT MODELED BY GEOMETRIES

(75) Inventor: Arnaud Deslandes, Suresnes (FR)

(73) Assignee: Dassault Systemes, Suresnes Cedex (FR)

( * ) Notice: Subject to any disclaimer, the term of this patent is extended or adjusted under 35 U.S.C. 154(b) by 1050 days.

(21) Appl. No.: 12/142,653

(22) Filed: Jun. 19, 2008

(65) Prior Publication Data

US 2008/0316204 A1 Dec. 25, 2008

(30) Foreign Application Priority Data

Jun. 25, 2007 (EP) .................................. 07012420

(51) Int. Cl.
 *G06T 17/00* (2006.01)
(52) U.S. Cl. ....................................... 345/420
(58) Field of Classification Search ........................ None
 See application file for complete search history.

(56) References Cited

U.S. PATENT DOCUMENTS 6,629,065 B1 * 9/2003 Gadh et al. ...................... 703/1

FOREIGN PATENT DOCUMENTS

EP 1 244 062 A2 9/2002

OTHER PUBLICATIONS

Hoffmann, C.M. and Joan-Arinyo, R., "A Brief on Constraint Solving," retrieved from the World Wide Web on Dec. 18, 2007 at http://www.imub.ub.es/aggm06/registration/RJArinyo.pdf>, pp. 1-38, Apr. 7, 2005.
Hsu, C., et al., "A Constraint-Based Manipulator Toolset for Editing 3D Objects," Proceedings of the Fourth Symposium on Solid Modeling and Application Atlanta, GA, May 14-16, 1997, pp. 168-180.
Lee, Jae Yeol, "A 2D Geometric Constraint Solver for Parametric Design Using Graph Analysis and Reduction," *ADG '98, LNAI 1669*: 258-274, (1999).
Peng, X., et al., "A Geometric Constraint Solver for 3-D Assembly Modeling," *Int. J. Adv. Manuf. Technol.*, 28:561-570, (2006).

* cited by examiner

*Primary Examiner* — Kee M Tung
*Assistant Examiner* — Carlos Perromat
(74) *Attorney, Agent, or Firm* — Hamilton, Brook, Smith & Reynolds, P.C.

(57) ABSTRACT

A computer program, system and method of computer-aided design of a 3D object. The 3D object is modeled by: (i) cells, the cells being restrictions of geometries of the model; and (ii) a cell graph comprising relations between the cells, which relations capture a topology of the model. The invention system edits an initial model by interacting with a user to identify intended displacements of initial geometries of the model. The system then selects the cells which are restrictions of the geometries to be displaced. Cells adjacent to the selected cells are collected according to the cell graph. Some of the adjacent cells are excluded by means of predefined rules. A solver computes transformations to be applied to initial geometries, from the intended displacements and geometries whose collected cells are restrictions thereof. Lastly the system builds new geometries according to the transformations and initial geometries.

16 Claims, 8 Drawing Sheets

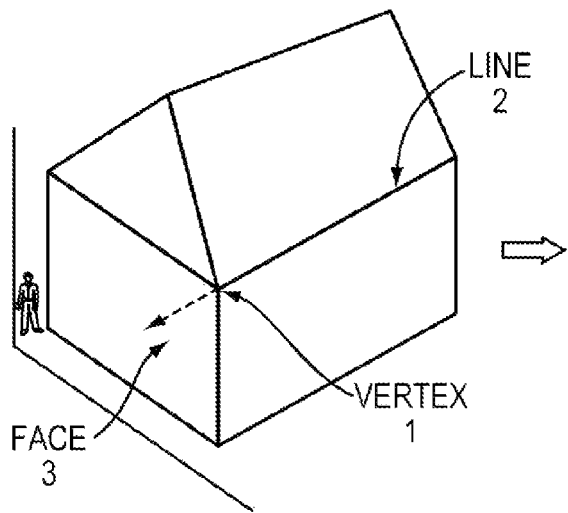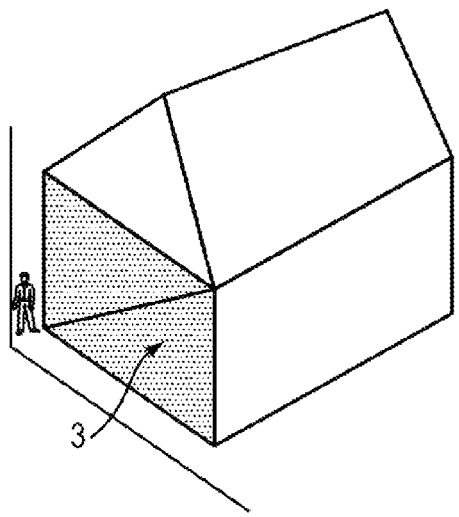
FIG. 1A
FIG. 1B
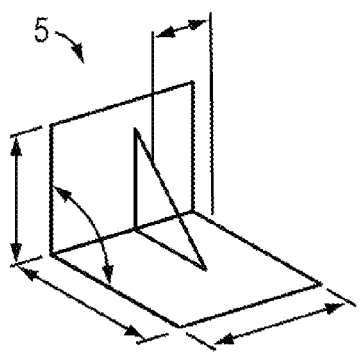
FIG. 2A
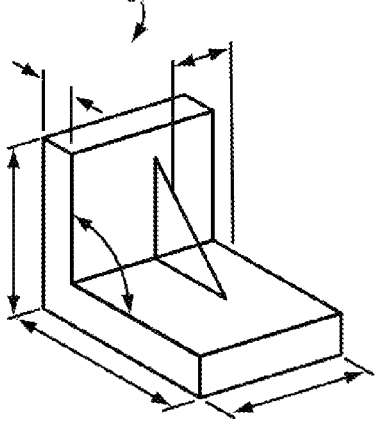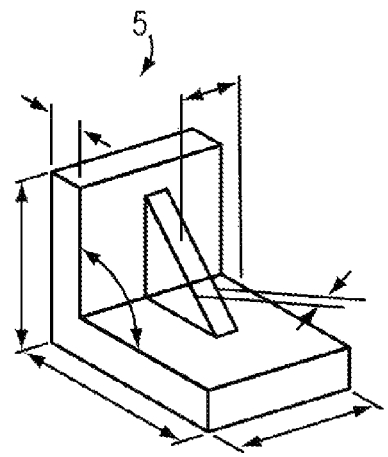
FIG. 2B
FIG. 2C

CELL/GEOMETRY RELATIONSHIPS 23

FACE 10 IS RESTRICTION OF PLANE 10'
EDGE 16 IS RESTRICTION OF LINE 6
EDGE 17 IS RESTRICTION OF LINE 7
EDGE 18 IS RESTRICTION OF LINE 8
EDGE 19 IS RESTRICTION OF LINE 9
VERTEX 11 IS RESTRICTION OF POINT 11'
VERTEX 12 IS RESTRICTION OF POINT 12'
VERTEX 13 IS RESTRICTION OF POINT 13'
VERTEX 14 IS RESTRICTION OF POINT 14'
VERTEX 15 IS RESTRICTION OF POINT 15'

GEOMETRIES 25

SYSTEM AND METHOD OF COMPUTER-AIDED DESIGN OF A 3D OBJECT MODELED BY GEOMETRIES

RELATED APPLICATION

This application claims priority under 35 U.S.C. §119 or 365 to European, Application No. EP 07012420.1, filed Jun. 25, 2007.

FIELD OF INVENTION

The invention relates to the field of computers programs and systems, and more specifically to the field of computer-aided design (CAD) systems and computer-aided manufacturing (CAM).

BACKGROUND OF THE INVENTION

A number of systems and programs are offered on the market for the design of parts or assemblies of parts, such as the one provided by DASSAULT SYSTEMES under the trademark CATIA. These so-called computer-aided design (CAD) systems allow a user to construct and manipulate complex three dimensional (3D) models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are mainly specifications of geometry. In particular, CAD files contain specifications, from which geometry is generated. From geometry, a representation is generated. Specifications, geometry and representation may be stored in a single CAD file or multiple ones. CAD systems include graphic tools for representing the modeled objects to the designers; these tools are dedicated to the display of complex objects—the typical size of a file representing an object in a CAD system extending up to the range of a Megabyte for part, and an assembly may comprise thousands of parts. A CAD system manages models of objects, which are stored in electronic files.

Designing a mechanical part with a known CAD system amounts to define or modify specification of said part, that is, its geometrical shape and dimensions so that it fits functional and manufacturing requirements. The resulting shape is a combination of basic features: pad, pocket, groove, shaft etc. created by the designer. Through complex geometrical and topological computations, the CAD system yields the boundary representation of the solid (mechanical part) as e.g. a closed and oriented surface. A solid model means a three-dimensional model of an object in a computer.

Designing a modeled object (a part or a product of parts) actually comprises two steps: a conceptual design followed by a detailed design. Conceptual design is to sketch the main shape or skeleton of a 3D object (or assembly of 3D objects) so that it fits a predefined mechanical function. Next step is detailed design, which is to refine the functional shape to take into account manufacturing constraints (forging, casting, welding, sheet metal, electro erosion etc.). Detailed design will however not be further discussed as it is not a main concern for the present invention.

Reverting to conceptual design: since an object is not yet entirely designed at this step, the user deals with simple geometries (mostly profiles including lines and circles, planar faces, cylindrical faces). Furthermore, relative positions of these geometries are modified all along the investigation process. For this purpose, tools are available to change the shape: interactive direct manipulation, positioning and dimensioning constraints. The topology of the object is captured, maintained and updated by the system so that the 3D structure of the object remains consistent. This allows hidden surfaces display, collision detection, mass, area computation, behavior simulation through finite element analysis.

One of the most popular technologies involved in CAD systems is perhaps the "historical design". Here, the user creates design features via interactive commands and the system captures the ordered sequence of features creation, their input parameters and relationships. So, modifying a solid is for the designer to edit a feature, change its input parameters and for the system to replay the ordered sequence to compute the modified shape.

In contrast, only a few CAD systems are based on the so-called "B-rep modeling" technology. As opposed to historical design, the system here captures only the boundary representation of the solid, although creation tools are very similar to those provided by history-based CAD systems: profiles, extrude, revolute, sweep, round, fillet are such examples. Modifying a solid is performed in two steps. First, the designer selects the portion of the boundary of interest and expresses the change intent (increase round radius value, decrease a hole diameter, remove boss . . . ). Second, the system performs this local change while maintaining the boundary representation closure.

As to boundary representations, it may be distinguished amongst systems which constrain the user to build data representations of real-like objects only, e.g. objects which may actually exist in the real world and systems which allow the user to build data representations of hybrid or impossible objects or data components (such as vertices) that have no physical manifestation. The former are called "manifold modelers", as opposed to "non-manifold" modeler. Note that non-manifold geometry is often used as intermediate design steps, making it in fact often un-avoidable in true usage of CAD system. The term "manifold" has an exact mathematical definition, which will not be discussed here besides that in 3D, a mathematical manifold corresponds somehow to a physically realizable object.

Next, also known are the recent "functional modeling" systems, which are in fact a layer of software on top of a classical history-based technology.

Besides, it is worth mentioning that all industrial CAD systems provide a 2D sketcher where dimensioning and positioning constraints are available as well as direct manipulation. Some systems provide 2D or 3D dimensioning and positioning constraints at part design level. Nevertheless, only manifold solids can be dimensioned.

In this respect, any industrial CAD system yields a "manifold boundary solid object", meaning in practice that only thick and regular 3D objects can be modeled. "Regular" means that the boundary of the solid locally cuts neighboring space into exactly two portions (inside and outside), excluding all singularities. "Thick" means that the solid may not locally be approximated by a surface or a wire, meaning that multidimensional objects are out of reach.

Furthermore, most CAD systems provide 3D dimensioning and positioning constraints at assembly level, where solid parts are managed as rigid objects. As a further remark, note that dimensioning and positioning constraints differ from feature parameters, which are often displayed through double arrows and dimension values. A dimensioning and positioning constraint is created a posteriori by the designer and connects arbitrary objects.

As mentioned above, dimension and shape of the mechanical part are controlled by dimensioning and positioning constraints. Dimensioning constraints involve a numerical value (mostly a distance or an angle) through a parameter. Changing the numerical value is for the designer to edit the parameter.

Other features may be used to capture the design intent. These are: design variables, equalities or inequalities, collectively named "engineering equations". A design variable is set by the designer or by a formula and captures a typical numerical value of importance. An equality is a mathematical function involving design variables, constraints parameters, or topological objects (solid, face, curve) into a single formula targeting zero value: $f(a, b, c, \ldots)=0$, as opposed to an inequality that targets a range of values $f(a, b, c, \ldots) \geqq 0$. The mathematical function is usually evaluated by an algebraic formula, a predefined table or a computer program. Typically, the dimensional parameters of a solid may change while preserving a constant volume $V_0$. This may for instance be captured by adding the equality $Volume(Solid)-V_0=0$ to the set of constraints. Preserving the area of a closed contour or the length of a curve is done the same way. Distance d separating two parallel planes can be controlled by an equation $d-2b=0$ where b is a design variable. If the overall mass of a solid part must not exceed a given value $m_{max}$, the inequality $\rho Volume(Solid) \leqq m_{max}$ is needed, where $\rho$ is a constant parameter depending on the part material.

For the sake of completeness, fundamentals of traditional solid modeling can be found in "Geometric and solid modeling: an introduction" C. M. Hoffmann, Morgan-Kaufmann 1989. Fundamentals of cell complex applied to geometric modeling can be found in "SGC: a dimension independent model for point sets with internal structures and incomplete boundaries" J. R. Rossignac, M. A. O'Connor, IBM research report RC14340, 1989. Fundamentals of 3D dimension and constraint management can be found in "Solving geometric constraints systems", G. A. Kramer, M.I.T Press and "A brief on Constraint Solving" C. M. Hoffmann and R. J. Arinyo, Computer-Aided Design and Applications, Vol. 2, No. 5, pp 655-663, 2005.

Next, the following research papers deal with conceptual design by sketching, dragging and deforming solid objects:

"Constraint objects—integrating constraint definition and graphical interaction", H Hsu, B. D Bruderlin, Solid Modeling '93, Montreal, Canada.

"Inferring 3D models from freehand sketches and constraints", L. Eggli, H Hsu, B. D Bruderlin, G. Elber, Computer Aided Design, Vol. 29, pp. 101-112, 1997.

"A constraint-based manipulator toolset for editing 3D objects" C. Hsu, G. Alt, Z. Huang, E. Beier, B. Bruderlin, Solid Modeling '97, Atlanta USA.

"A constraint-based shape modeling system" B. Bruderlin, U. Doring, P. Michalik, Geometric constraint solving & applications, Springer Verlag, 1998.

The methods disclosed in the research papers above actually make use of positioning and dimensioning constraints to arrange faces, edges and vertices of solids so that free deformation is possible. The data model captures the whole solid through coincidence constraints. In other words, the topology of the boundary representation is translated into point/plane coincidence constraints. Starting from the object to move (a face or a vertex), this network is traversed to get degrees of freedom (DOF) of geometrical objects. A so called "dependency graph" is computed from the sub-graph resulting from traversal of the network. The dependency graph used to update geometries is an acyclic graph.

Also known is Google's SketchUp software (2007), which allows for creation and direct manipulation of solid models. Snapshots represented on FIGS. 1A-B show that pulling vertex 1 along line 2 breaks planarity of face 3. However, how topological consistency is saved in this case is not suited for today's industrial CAD. In this case, design intent of the user is lost. Furthermore, how the system splits face 3 into two adjacent triangles (as shown in FIG. 1B) is out of the designer's control.

Next, modifying a "history based" solid requires dealing with the complexity of its history. Not all modifications are possible, only those that are compatible with the creation path. This inhibits creativity at conceptual phase, where, by nature, unexpected changes may happen. B-rep modeling systems are more flexible from this point of view, but they do not provide genuine 3D dimensioning and positioning constraints at part level. Constraints can be created in 2D or 3D sketches, while non driving constraints (measuring constraints) are created at part level. Consequently, 3D and easy accurate design is out of reach. In addition, such system cannot support other constraint types, such as kinematics or dynamics constraints, nor engineering equations.

Furthermore, all 3D industrial CAD systems yield a "manifold boundary solid object". As said, only thick and regular objects can be contemplated, such that multidimensional objects cannot be contemplated. In contrast, non-manifold boundary representation means data which can represent not only a manifold, but also a non-manifold (e.g. one edge shared by more than two faces). Mathematically speaking, the representation space corresponds to a Euclidean Cell Complex.

To illustrate the above concepts, FIGS. 2A-2C illustrate three versions of the same object 5. The leftmost object is the conceptual view: an L-shape part equipped with a stiffener. The main shape is set, but actual thickness is not yet defined. Only a non manifold modeler can support this shape. The middle object combines a thick L-shape solid together with a zero thickness (surface) stiffener. Here, the stiffener thickness is not yet defined. Once more, only a non manifold modeler would support this multi dimensional shape as a mix of a 3D solid and 2D surface. The rightmost object is the traditional manifold representation available in any industrial CAD system. The solid is bounded by a closed and oriented surface.

Besides, known algorithms to deform solids through constraints use a "brute force" solution, which is inoperative. The "brute force solution" is to pickup all geometries and all constraints, translate all topological adjacencies into coincidence constraints, and send this to the solver. This is not convenient and effectively fails for the following reasons.

Firstly, the system is always under-constrained, which means that infinity of solutions exists. Consequently, this raises the risk of unexpected behavior: the designer hardly tolerates that a piece of geometry not involved in the modification is moved by the solver, even if it is correct from the theoretical point of view.

Secondly, the solving performance does not fit real time or even interactive response time, even for a rather small model.

Thirdly, large models saturate the solvers capabilities: either computer time or memory management.

Fourthly, the update complexity is proportional to the complexity of the entire model, and not to the complexity of the modification as expected by the designer.

Therefore, there is a need for finding a solution for lowering the risk of unexpected behavior, when modifying a modeled object with a CAD system. Furthermore, said solution should result in acceptable response time and be compatible with large models, without saturating solvers capabilities.

SUMMARY OF THE INVENTION

Preferably, the present invention should also provide a solution compatible with non manifold topology. Indeed, a non manifold modeler would be advantageous for conceptual design because since most of the part is under study and many parameters are still unknown, approximations must be supported in a consistent way so that simulations can be computed and alternate solutions investigated.

To solve the above problem, the present invention proposes a method of computer-aided design of a 3D object modeled by cells, the cells being restrictions of geometries of the model; and a cell graph comprising relations between the cells, which relations capture a topology of the model, the method comprising the steps of:
  editing an initial model by interacting with a user to identify intended displacements of initial geometries of the model; and selecting the cells which are restrictions of the geometries to be displaced;
  collecting cells adjacent to the selected cells according to the cell graph, some of the adjacent cells being excluded by means of predefined rules;
  computing by a solver transformations to be applied to initial geometries, from the intended displacements and geometries whose collected cells are restrictions thereof, and
  building new geometries according to said transformations and initial geometries.

In other embodiments, the process according to the invention may comprise one or more of the following features:
  said predefined rules are such that said adjacent cells are collected up to nth-order in the cell graph;
  at said collecting step, said predefined rules are such that said adjacent cells are collected up to third-order in the cell graph;
  at said collecting step, said predefined rules comprise a set of rules excluding, from said adjacent cells to be collected, any cell corresponding to a regular vertex bounding a collected cell;
  said collecting step comprises applying said set of rules until self-consistency thereof is achieved;
  cells relate to vertices, edges and faces and the set of rules comprises: for an input vertex: collecting faces bounded by said input vertex; for an input edge: collecting vertices bounding said input edge; and for an input face: collecting vertices bounding said input face, excluding regular vertices;
  the set of rules further comprises: for an input vertex: collecting edges that are bounded by said input vertex and that are restrictions of a geometry being a non-linear curve; for an input face: collecting vertices bounding said input face, and that bound a face that is a restriction of a geometry being a non-planar surface, or that bound an edge which is a restriction of a geometry being a non-linear curve;
  the set of rules further comprises: for an input cell linked to a constraint, collecting other cells linked to said constraint;
  the set of rules further comprises: for an input vertex, as selected at the step of selecting, collecting the vertices that bound the faces bounding said input vertex; and for an input edge, as selected at the step of selecting, collecting the vertices that bound the faces bounding said input edge;
  the step of collecting further comprises: accessing the cell graph for translating topology shared by the geometries whose collected cells are restrictions thereof into coincidence constraints prior to sending said coincidence constraints to the solver for computing said transformations;
  at the steps of editing, the intended displacements are at least partially encoded as constraints;
  the step of selecting the cells comprises: adding cells bounding the selected cells to the selected cells, prior to collecting; and
  the step of building new geometries comprises accessing the cell graph.

The invention further concerns a computer program (and a system comprising said program) comprising code means adapted for implementing the steps of the method according to the invention.

Furthermore, to the best of their knowledge, whilst suggesting some features and variations useful for the understanding of the present invention in general, the prior art has not disclosed some of the highly advantageous features of the present invention discussed herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1A-1B are an exemplified manipulation of a solid model according to prior art.

FIG. 2A-2C illustrates three versions of a same modeled object, including an "unreal" object (non manifold), an hybrid and a thick object (manifold).

DETAILED DESCRIPTION OF THE INVENTION

Figure 3A:
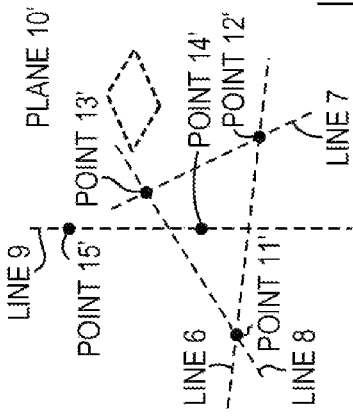
FIG. 3A shows an example of a non-manifold object.
Figure 3A:
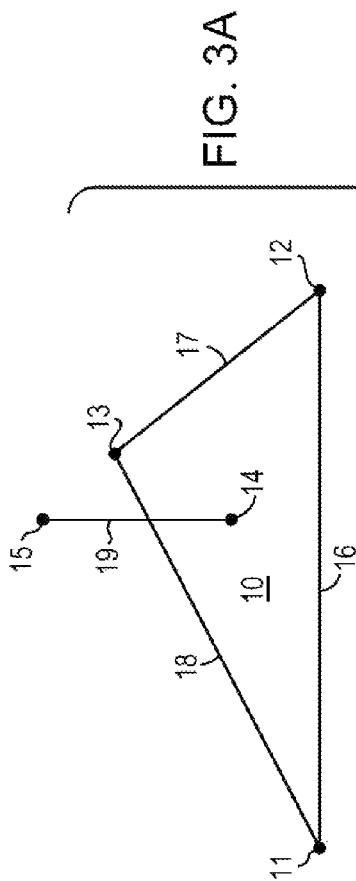

A description of example embodiments of the invention follows.

The present invention provides a method of computer-aided design of a 3D object modeled by cells and a cell graph. After editing the modeled object, geometries are collected via a mechanism of adjacency of cells in a cell graph. Thus, instead of collecting all the cells, only locally adjacent cells are picked-up by the system. Adjacency is restricted by excluding cells according to predefined rules. As not all cells are taken into account, solving performances (and so the response time) are improved. This further lowers unexpected behaviors, as shall be discussed. For example, a set of rules is used such that faces and vertices are collected, excluding regular vertices bound to a face collected. In another embodiment, adjacency is limited to a given nth-order adjacent cell.

More generally, the present invention aims at providing, in an embodiment, a method to feed a general purpose numerical solver with the appropriate inputs so that the shape of 3D objects is updated according to topology, constraints and equations. In particular, the invention may involve non manifold geometry, dimensioning and positioning constraints, engineering equations, and numerical solving and this, in a way that all such capabilities behave harmoniously.

For the sake of understanding, a number of definitions are given below.

"Geometry" is a generic term gathering mathematical objects defining a subset of 3D space through an equation or a parametric mapping. Planes, lines, points are geometries as well as surfaces and curves.

"Topology" defines how geometries are trimmed and sewed together to make a wire, open or closed skin or a mix of both.

A "cell complex" is a structure able to describe a wide range of 3D objects: it can be seen as a set of cells together with a set of geometries.

A "cell" is a generic word for: volume, face, edge and vertex. The set of cells may be equipped with an oriented graph structure capturing the " . . . is bounded by . . . " relationship and named the "cell graph". So, elementary relationships are: "a volume is bounded by faces", "a face is bounded by edges" and "an edge is bounded by vertices".

Non manifold situations, which are contemplated in the present invention, may involve more relationships, such as "a volume is bounded by edges" (or vertices); "a face is bounded by vertices". When cell A is bounded by cell B, cell B belongs to the boundary of cell A or B is a boundary cell of cell A or cell A belongs to the co-boundary of cell B or cell A is a co-boundary cell of cell B.

Cells are related to geometries by the link " . . . is a restriction of . . . ". Accordingly, a volume is a restriction of the 3D space, a face is a restriction of a plane or a surface, an edge is a restriction of a line or a curve, and a vertex is a restriction of a point. A geometry that is the restriction of a cell is called a "support" of the cell in question.

As a summary: a 3D object is here modeled based on (a) cells, which are restrictions of geometries, and on (b) a cell graph, which comprises relations between the cells, said graph capturing the topology of the model.

Furthermore, given a cell complex, it comes that geometries are not independent and must preferably comply with topological links. For example, an edge E is shared by two faces F1 and F2. Let P1 be the plane support of F1 and P2 the plane support of F2. Then, line L which supports edge E is the intersection line of P1 and P2.

Figure 3B:
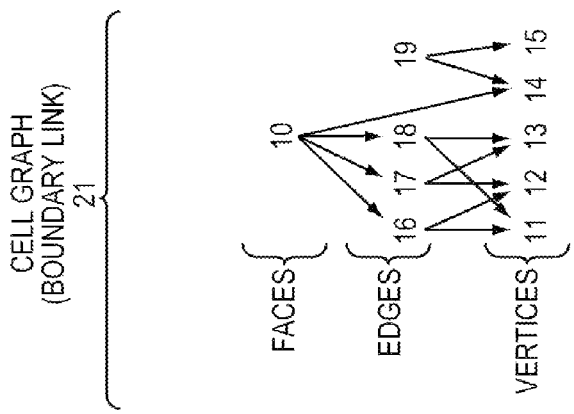
FIG. 3B depicts schematically a suite of cell graph, cell/geometry relationships and geometries corresponding to the object of FIG. 3A.

The above concepts are exemplified in FIGS. 3A and 3B. FIG. 3A shows a non-manifold object, consisting of a 2D triangle connecting an edge 19, oriented in 3D space. The represented object has a face 10, edges 16, 17, 18, 19 and vertices 11, 12, 13, 14, 15. FIG. 3B depicts a corresponding cell graph 21 (with boundary links drawn as arrowed lines, as discussed above), the cell/geometry relationships 23 and the resulting geometries 25, within three respective portions, going from left to right. For example, face 10 is bounded by edges 16, 17, 18 and vertex 14 (i.e. the bounding links). An immediate cell/geometry relationship 23 is that face 10 is a restriction of plane 10', as depicted in the geometries portion 25 of the figure.

Furthermore, a number of topological data structures involve additional objects such as "loop", "shell", "sub-shell", "lump" etc. Such objects can be computed from the cell graph 21 using connectivity. They are however of little importance as to the basics of the present invention and will not be discussed here.

Figure 4:
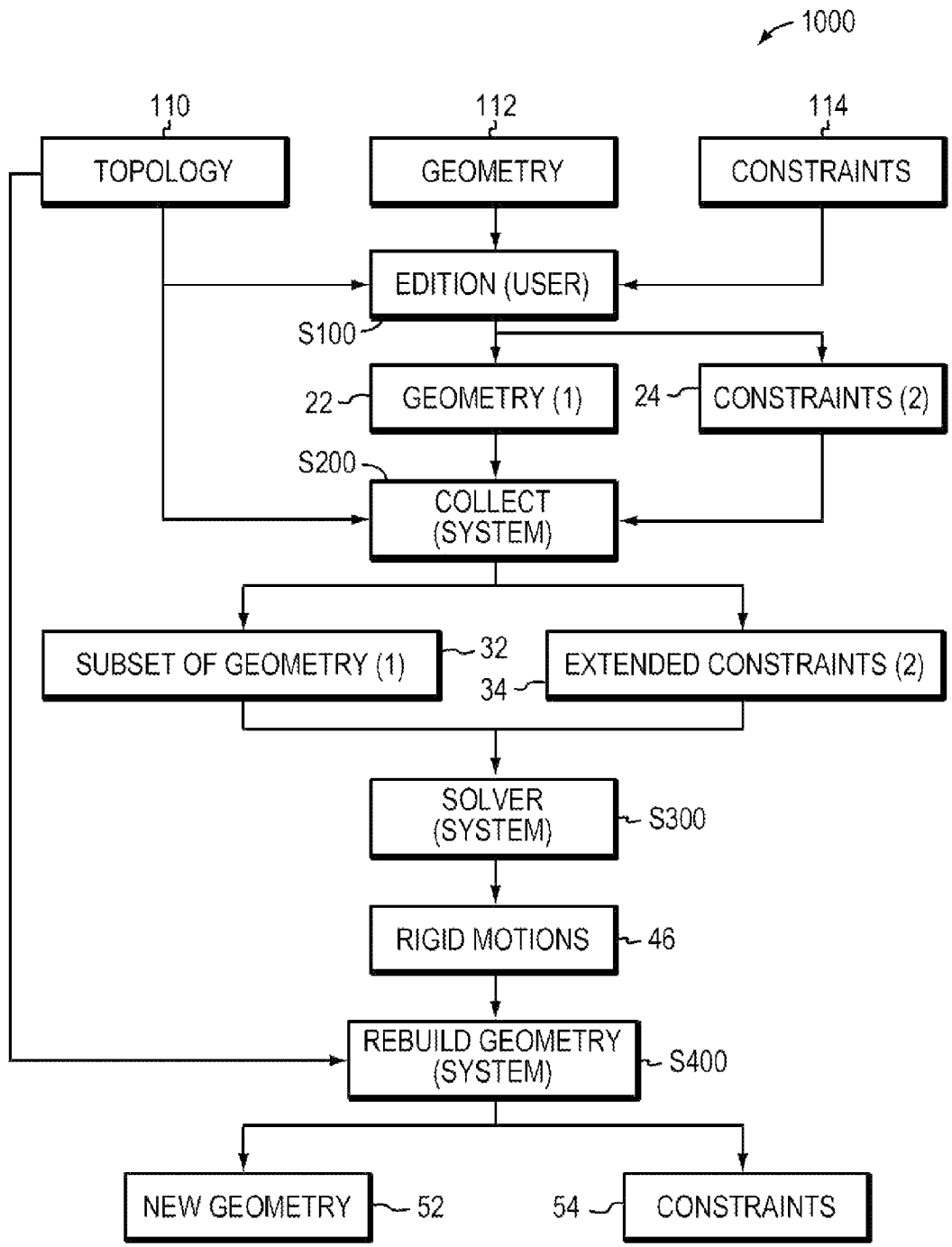
FIG. 4 is a flowchart reflecting the method according to an embodiment of the invention.

The algorithm underlying the present invention is hereafter discussed broadly, in reference to FIG. 4.

The initial model is a 3D object modeled by a topology 110 (for example non manifold), geometries 112 and possibly constraints 114. Thus the subject model is generally referenced 110, 112 and 114 (combined). Topology 110 captures faces, edges and vertices adjacencies. Topology 110 is itself captured in a cell graph (like 21 of FIG. 3B). Geometries 112 underline topological objects: 3D infinite planes of planar faces, free form or canonical surfaces of non planar faces, 3D infinite lines of linear edges, 3D curves of curved edges, 3D points of vertices. Constraints 114 link geometries 112 through dimensioning and positioning relationships (distance, angle, coincidence, parallelism etc.).

We note that the use of constraints 114 is not mandatory, so that one may contemplate implementing the invention without involving constraints. Yet, in the following, it is assumed that constraints 114 are involved and, in particular, that the solver does not deal with topological relationships.

At initial situation, the above data are up to date, which means that all constraints 114 are satisfied, if any, and that geometries 112 are compliant with the topology 110.

The designer edits this model (step S100) e.g. by moving a mouse pointer (cursor control) or by changing a numerical value of a constraint 114, or by creating a new and non satisfied constraint 24. Such operations are well-known in the art. This results for the invention system 1000 in selecting one or more cells.

After this edition step S100, some geometries 22 are intended to be displaced, e.g. at new positions, and some constraints 24 are possibly not satisfied. This is captured in FIG. 4 by tags (1) and (2).

Then, the system 1000 proceeds to collect data (step S200). This step will be discussed later in more details. For short, given known information, e.g. the topological relationships 110, the constraints 114 network, the knowledge of moved geometries 22 and unsatisfied constraints 24, the system 1000 gathers data to feed the solver. This is performed through the following substeps:

1. Collect the appropriate subset 32 of geometries 22, 112.
2. Collect the appropriate set of constraints 24, 114 related to these geometries 32.
3. Translate topological relationships shared by these geometries 32 into coincidence constraints 34.

The first two of these substeps are performed together, due to the underlying organization of cells/geometry/constraints relationships. The third substep above is there for the situations where the solver does not deal with topological relationships. By definition, the extended constraints referred to in the figure under reference 34 are the subset of constraints 24 already involved in the process at this stage together with additional coincidence constraints 114 translated from topology 110. At this level, the resulting constraints 34 are still not all satisfied.

The collect algorithm is designed in such a way that new geometries 22 can be computed in a number of cases. Ideally, the collecting step S200 is designed so as to allow for rebuilding new geometries 22 in all cases. How the collect step S200 is designed exactly depends on situations and applications contemplated. A number of examples will be discussed later.

Given geometries 32 and relationships 34, the task of the solver (step S300) is to find new geometries (e.g. new positions thereof) so that all the extended constraints 34 are satisfied. Yet, the solver does not move geometries 112. It returns instead transformations 46 that must be applied to geometries 112 so that they are properly located. Incidentally, while said transformations 46 shall in general be rigid motions, other transformations (such as homothetic transformations) can be contemplated, such as said transformations which preserve the very nature of the modeled object. In the following, rigid motions 46 are assumed to be returned by the solver.

Finally, geometries 112 are rebuilt (step S400) by the system 1000, resulting in new geometries 52 and possibly new set of constraints 54. This step is based on the assumption that the modifications preserve the initial topology 110. Motions 46 returned by previous step/solver S300 are applied to geometries 112.

Accordingly, the invention allows, in an embodiment, for capturing the design intent through geometry, topology, dimensioning and positioning constraints, design variables, equalities, inequalities, created by the user and the solver takes all these features into account to provide a result that fits these specifications.

Preferably, in case the topology 110 that was ignored by the solver is not compliant with the moved geometries 22, then the cell graph 21 is reused (not shown in FIG. 4) in order to compute new geometries of edges and vertices, when the solver moved their adjacent geometries. An example will be given.

As said above, the adjacency mechanism involved at the collecting step S200 is restricted by means of predefined rules. This allows for restricting the number of cells collected, whereby solving performances are improved and the risk of unexpected behaviors lowered. Different rules can be contemplated: this shall be depicted through two general embodiments in the course of the present description.

Here, a first general embodiment is described in which the collecting step S200 is governed by a set of rules, which notably result in excluding cells corresponding to a regular vertex bounding a cell to be collected.

Preferably, said embodiment relies on collecting geometries 32 and making extended constraints 34, as evoked earlier. Input data for collecting geometries step S200 is a set of cells. These may either be the cells moved by the designer, or cells linked to non satisfied constraints 24 after edition of the model at step S100.

Figure 5:
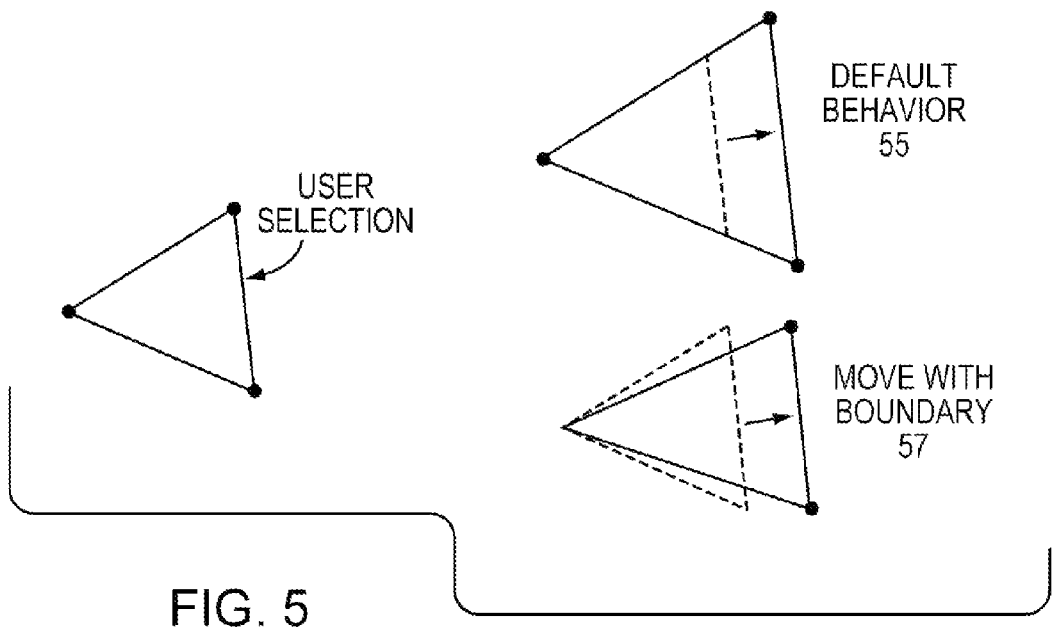
FIG. 5 compares default and optional behaviors offered in an embodiment of the invention, when moving cells corresponding to geometries of the modeled object.

In this respect, two behaviors may be expected from a cell motion. Referring now to FIG. 5: in some circumstances, the designer needs to move the support of the selected cell (default behavior 55 in FIG. 5) while in other circumstances, the cell is moved together with its boundary ("move with boundary" 57 in FIG. 5). For this purpose, a dedicated "move with boundary" option is available in the user interface, resulting in a modification as illustrated in FIG. 5. Such an option allows therefore for more flexibility at edition of the model.

Accordingly, if the "move with boundary" option 57 is set, the cells bounding the selected cells are added to the set of selected cells. This yields a new set of selected cells, which shall then be taken as "input cells" in the following. The input cells behave like a rigid set.

The predefined rules evoked above may in particular comprise a set of rules which is executed until self-consistency of the output cells is achieved. The set of rules used for collecting cells must ensure that self-consistency can be achieved during the rebuild process/step S400. For example, we can consider a vertex that is adjacent to four faces, each of the faces being the restriction of a plane. If one or several of the four planes are moved by the solver, the set of rules must ensure that the four planes at their new position intersect in one point, and so that it is possible to define a new position for the vertex while maintaining its adjacency with the four faces.

Preferably, the set of rules may aggregate the rules listed in one or more of the tables below.

As a first example, the following set of rules (Example A) is suitably applied when the model contains only geometries 112 that are point, lines, and planes (but the model here does not contain constraints 114).

TABLE 1

Example A of set of rules

| Rule number | Cell | Collected cells |
| --- | --- | --- |
| 1 | Vertex | Faces bounded by the vertex |
| 2 | Edge | Vertices bounding the edge |
| 3 | Face | Vertices bounding the face that are irregular vertices (see comment below) |

As another example, the following set of rules extends the previous set A (of Table 1). It is suitably applied when the model contains geometries 112 that are point, lines, planes, non-linear curves, non-planar surfaces; and contains no constraints 114. It contains all the rules of the set A (Table 1), which are augmented according to the following:

TABLE 2

Example B of set of rules

| Rule number | Cell | Collected cells |
| --- | --- | --- |
| 1.1 | Vertex | Edges bounded by the vertex and that have a geometry that is a non-linear curve |
| 3.1 | Face | Vertices bounding the face and that bound a face that has a geometry that is a non-planar surface<br>Vertices bounding the face and that also bound an edge that has a geometry that is a non-linear curve |

As a further example, the following set of rules extends the previous set A (Table 1) or set B (Table 2); it is suitably applied when the model contains one or more constraints 114. It contains all the rules of the set A or of the set B and contains also the following:

TABLE 3

Example C of set of rules

| Rule number | Cell | Collected cells |
|---|---|---|
| 4 | All cells | If the cell is linked to a constraint, collect all other cells linked to this constraint |

As still another example, the following set of rules extends the previous set A, B, or C (Tables 1, 2, 3); it applies only to cells selected by the user, that is, during the initial step of editing (and more particularly at the step of cell selection). It contains all the rules of the set A, B, or C and contains also the following:

TABLE 4

Example D of set of rules

| Rule number | Selected Cell | Collected cells |
|---|---|---|
| 5 | Vertex | Vertices that bound the faces bounded by the vertex |
| 6 | Edge | Vertices that bound the faces bounded by the edge |

Comments are in order. First, by definition, an irregular vertex is a vertex that bounds four faces or more; a regular vertex is a vertex that bounds three faces or less.

The above criteria (Tables 1-4) are notably designed to feature the expected behavior when the designer pulls a face among a set of tangent planar faces of a given modeled object. In particular, the above rules were designed to ensure that rebuilding at step S400 may occur in any situation. In other words, it ensures that topology 110 is preserved in any situation.

For example, executing the above rules, if a face is moved, adjacent faces are tilted and remaining faces do not move.

A possible advantageous algorithm suited for implementation of the above rules is discussed now. Given a cell c within a cell complex, it is defined a function CollCell(c) yielding the set of cells collected by c and a function Cst(c) yielding the set of coincident constraints linking the (supports of) cells within $\{c\} \cup CollCell(c)$. Let S be the set of input cells, c the output set of collected cells and K the output set of coincidence constraints. The following steps are taken:

(1) C:=S
(2) K:=φ
(3) Mark all cells of C "not visited".
(4) Mark all cells of C "input cell".
(5) while there exists a "not visited" cell c in C do begin
(6) mark c "visited"
(7) C:=C∪CollCell(c)
(8) K:=K∪Cst(c)
(9) end while
(10) G={Supp(c);c∈C}.

In particular, the "input cell" mark set at step (4) is used at step (7) by CollCell(.) function according to the previous table. According to set theory, a set may not duplicate elements. So instructions (7) and (8) like A:=A∪B are supposed not to duplicate elements of A∩B if any. After completion of the "while" loop, instruction (10) computes the set of collected geometries G as the set of supports of all collected cells in C. Once more, instruction (10) is supposed to remove duplicated elements. The coincidence constraints in set K link the corresponding supports.

As said, the previous section describes rules for cell collection suited for various situations, including e.g. tangent planar faces, non planar edges, non planar faces. However, the skilled person shall understand that such set of rules are not mandatory, in particular not in simple design situations.

For example, the simplest solid for conceptual design includes only planar and non tangent faces. Furthermore, the most natural user interaction to modify a conceptual solid is to move a planar face. This is because "functional" information is captured by faces rather than edges or vertices. So, restricting this way the conceptual design environment allows for significantly simplifying the set of collecting rules.

As an example, the following irreducible subset of rules was designed which suits the last example discussed above. Said subset is reflected in Table 5 below.

TABLE 5

Example of irreducible set of rules

| Rule number | Cell | Collected cells |
|---|---|---|
| 1 | Vertex | Faces bounded by the vertex. |
| 3 | Face | Vertices bounding the face, excluding regular-vertices. |

Figure 6:
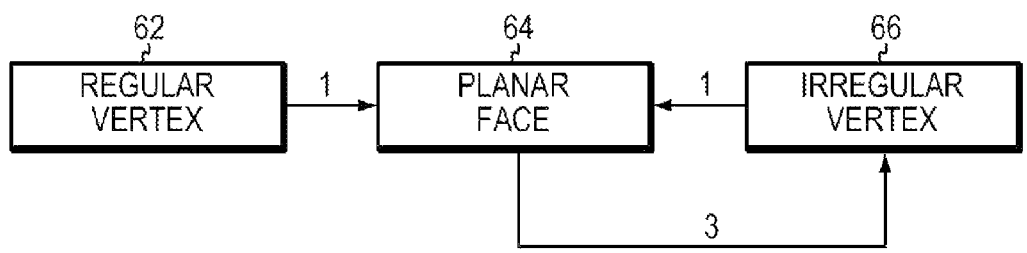
FIG. 6 is a graph representing a simplified set of predefined rules for excluding cells when locally collecting cells, according to an embodiment of the invention.

These rules are captured by the directed graph as illustrated in FIG. 6, wherein an arrow means " . . . collects . . . ". So a regular vertex 62 collects planar faces 64 bounded by that vertex 62. Each planar face 64 collects irregular verteces 66 bounding the face 64. Irregular vertex 66 collects planar faces 64 bounded by the vertex 66.

The above rule set (Table 5) is irreducible in the context discussed above (only planar and non tangent faces) and in the following meaning: missing one of these two rules would cause the "rebuild geometry" step S400 to fail in some situations, as discussed in the example below, in reference to FIGS. 7A-C.

Figure 7A:
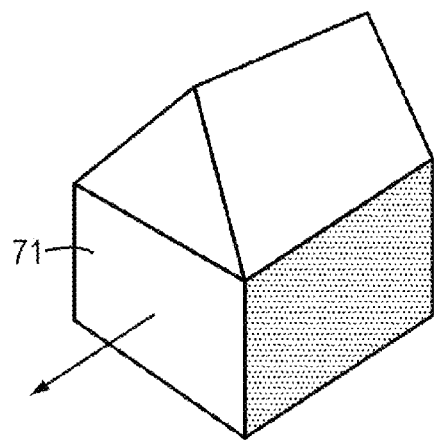
FIGS. 7A-7C illustrate a deformation of simple object with its cells.
Figure 7B:
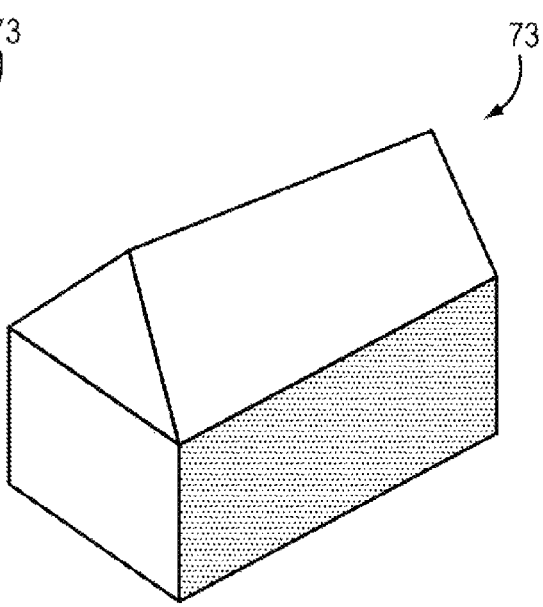
Figure 7C:
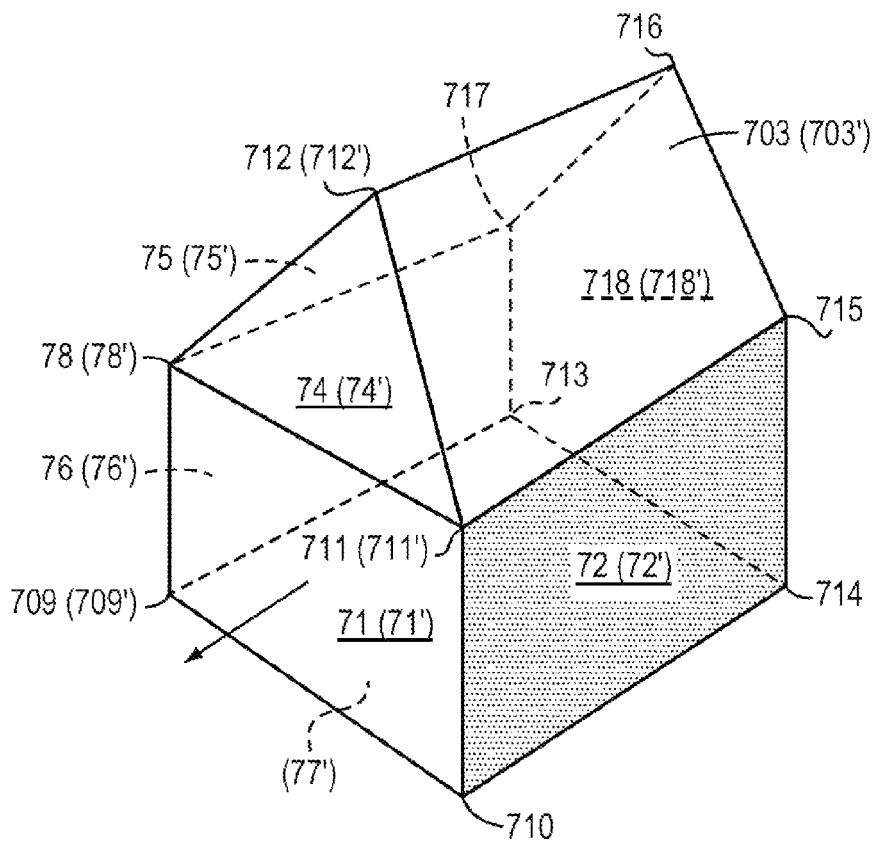

Here, the context is that of a designer selecting front face 71 and pulling it (FIG. 7A) in order to extend the house 73 (FIG. 7B), as represented by the arrow protruding from face 71 in FIG. 7A.

According to the above irreducible subset of rules, the iterative collect process runs as follows (referring more particularly to FIG. 7C).

1. The list of collected objects is initialized with face 71.
2. Applying rule 3 to face 71 collects vertices 78 and 711. Vertex 709 is not collected because it is regular (as shared by three faces). Vertex 710 is not collected either for the same reason.
3. Applying rule 1 to vertex 78 collects faces 74, 75 and 76 (not face 71 because it is already in the list).
4. Applying rule 1 to vertex 711 collects faces 72 and 703 (not faces 71 and 74 because they are already in the list).
5. Applying rule 3 to faces 72, 703, 74, 75 and 76 does not collect new vertices because remaining vertices 712, 713, 714, 715, 716 and 717 are regular.
6. Using the convention that point j is the support of vertex j and that plane k is the support of face k, the collected geometries are: points 78' and 711', planes 71', 72', 703', 74', 75' and 76'.
7. According to topological adjacency, coincident constraints are: point 78'/plane 71', point 78'/plane 74', point 78'/plane 75', point 78'/plane 76', point 711'/plane 71', point 711'/plane 72', point 711'/plane 703', point 711'/plane 74'.

So, input data sent to the solver in this example are geometries and constraints listed in step 7 above. All geometries are located at their current position, which means that plane 71' (support plane of the moved face 71) is located at its new (user defined) position.

Let T be the translation applied to plane 71' according to the design intent (as depicted in FIG. 7A). Thanks to above rules, the solver does not have to move and thus does not move planes 72', 703', 75' and 76' because they would else slide along themselves. Plane 74', points 78' and 709' are moved according translation T in order to preserve all coincidence relationships. Finally, the "rebuild geometry" step S400 updates the following geometries:

Point 712' by intersecting planes 703', 74' and 75'.
Edge 78-712 by intersecting planes 74' and 75'.
Edge 711-712 by intersecting planes 703' and 74'.
Edge 78-709 by intersecting planes 71' and 76'.
Edge 711-710 by intersecting planes 71' and 72'.
Edge 709-710 by intersecting planes 77' and 71'.

In addition, back face 718 is not collected and thus is not changed because plane 718' is not involved in the solving process. Bounding vertices of face 718 are unchanged because their incident planes are not modified. Topological consistency is accordingly achieved because, thanks to the coincidence constraints, the solver maintains the fact that point 78' is the intersection of four planes: 71', 74', 75' and 76' and that point 711' is the intersection of four planes: 71', 72', 703' and 74'.

In contrast, moving plane 71' while ignoring point 78', planes 72', 703', 74' and associated coincidences leads to inconsistency. In that case, intersection of planes 71', 72', 703' and 74' is the empty set for the following reason. Planes 72', 703' and 74' share a unique point that does not belong to (translated) plane 71'. So, point 78' is undefined and "rebuild geometry" step S400 is unable to restore consistency unless moving planes, which is normally the job of the solver.

While the above sets of rules were given as examples, more particularly suited for specific context, the skilled person shall furthermore understand that other predefined rules could be inferred, in view of the result sought, that is: collecting cells adjacent to the selected cells via the cell graph 21, while excluding some of the adjacent cells (e.g. useless cells). In particular, it proves in practice advantageous designing rules which exclude collecting adjacent cells corresponding to a regular vertex bounding a collected cell. This prevents from collecting cells which are not mandatory in the process, for example when pulling a face on a simple modeled object. Meanwhile, topology can be preserved.

In the second (general) embodiment of the invention that will be discussed now, the predefined rules work differently. As before, cells are excluded but now using another mechanism. Here, rules are predefined such that adjacent cells are collected up to a given order in the cell graph 21. Such an embodiment will be described in reference to FIGS. 7 and 8.

Starting from input cells, the graph can be accessed and explored in view of collecting neighboring cells (at first-, second-, third-order, etc.). Again, this allows for locally collecting cells, whereby collection is restricted so that both solving and behavioral performances are improved. Preferably, the mechanism of collecting geometries 32 also makes use of extended constraints 34, as previously introduced.

Having said this, various techniques are known which allows for a practical implementation. In particular, an algorithm well suited for this second embodiment is based on an iterative scan of the cell graph 21 stopped by a predefined depth $p_{max}$. This allows for a systematic scan.

Figure 8:
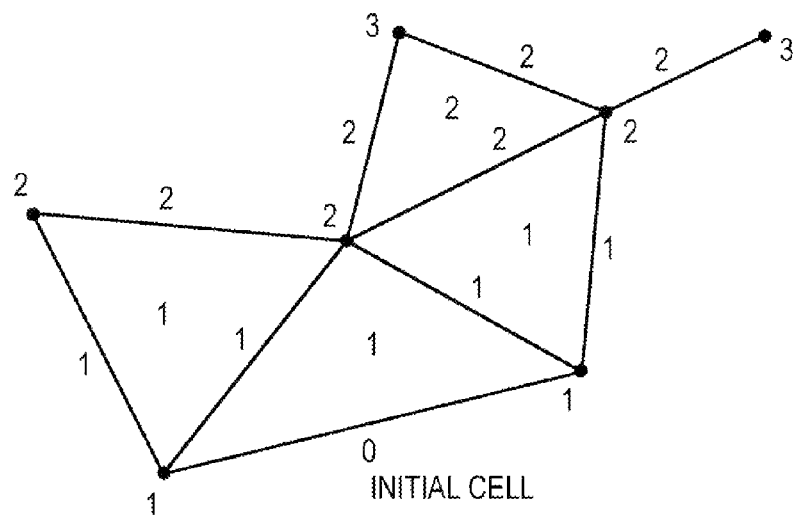
FIG. 8 shows a graph representative of the management of nth-order cell collection, according to another embodiment of the invention.

More specifically, and referring to FIG. 8 showing a graph representing depth values around a given cell: given a cell c (zero depth value by convention) the algorithm gathers all cells at zero distance from cell c and sets them a depth 1 value. Then, the algorithm gathers cells at zero distance from depth 1 cells and sets them a depth 2 value, etc. Given two cells A and B, the distance between A and B is defined by $d(A, B) = \min\{d(a, b); a \in A, b \in B\}$ where $d(a, b)$ is the Euclidian distance between points a and b. Depth values around a given cell are illustrated in the graph of FIG. 8.

Neighboring cells of a cell c are gathered by visiting the cell graph according to the following algorithm. Notation p(y) is the depth of cell y.

```
(1)   initialize the output set of neighboring cells with the input cells,
C := {c₁,...,cₙ}
(2)   mark all cells of C "not visited"
(3)   set a zero depth value to all cells of C
(4)   while exists a "not visited" cell c in C such that p(c)< p_max do
         begin
(5)         choose cell c with minimum depth
(6)         mark c "visited"
(7)         L := LocalNeighbors(c)–C
(8)         for all x ∈ L
(9)            mark x "not visited"
(10)           p(x):= p(c)+1
(11)        end for
(12)        C := C ∪ L
(13)  end while
```

Function LocalNeighbors(c) yields the set L of all cells at zero distance from cell c. Instruction (7) yields neighboring cells that are not already in C. The algorithm of LocalNeighbors(c) runs two steps here. Starting from cell c, collect all cells that can be reached by following a path using direct orientation of cell graph ("direct flow" in the Table 6 below). Then, starting from leaf nodes of this set of cells, collect all cells that can be reached by following a path using reverse orientation of cell graph ("reverse flow" in the Table 6 below).

Figures 9A, 9B:
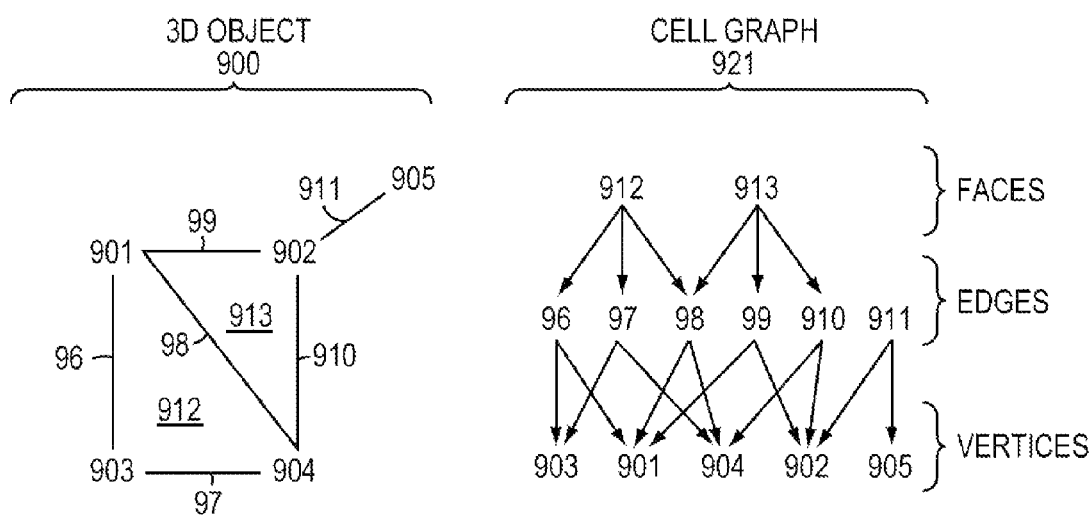
FIG. 9A-9B is another example of 3D object and associated cell graph.

Next example illustrates the iterations: this will be described in reference to FIGS. 9A and 9B. The object 900 under interest is made of two triangular faces 912 and 913 sharing edge 98, together with dangling edge 911 (FIG. 9A). Corresponding cell graph 921 is depicted in FIG. 9B.

Initial cell is edge 97. Starting from cell 97 and following direct orientation, yields cells 903 and 904. Following reverse orientation yields cells 96, 97, 98, 910, 912, 913. Consequently, depth-1 neighbors of cell 97 are cells 903, 904, 96, 97, 98, 910, 912, 913. So far, only cell 97 is "visited". Going on with a "non visited" cell with minimum depth, say 903, yields no cell through the direct flow. Reverse flow yields cells 96, 97, 912, which adds no new depth to set, etc. Next table illustrates the end of the process.

TABLE 6

| | cell collection according to second embodiment | | | | | |
|---|---|---|---|---|---|---|
| Cell | Direct flow | Reverse flow | Depth 0 | Depth 1 | Depth 2 | Depth 3 |
| 97 | 903, 904 | 96, 97, 98, 910, 912, 913 | 97 | 903, 904, 96, 98, 910, 912, 913 | | |
| 903 | — | 96, 97, 912 | | | | |
| 904 | — | 97, 98, 910, 912, 913 | | | | |

TABLE 6-continued cell collection according to second embodiment

| Cell | Direct flow | Reverse flow | Depth 0 | Depth 1 | Depth 2 | Depth 3 |
|------|-------------|--------------|---------|---------|---------|---------|
| 96 | 901, 903 | 96, 97, 98, 99, 912, 913 | | | 901, 99 | |
| 98 | 901, 904 | 96, 97, 98, 99, 910, 912, 913 | | | | |
| 910 | 902, 904 | 98, 99, 910, 911, 912, 913 | | | 902, 911 | |
| 912 | 901, 903, 904 | 96, 97, 98, 99, 910, 912, 913 | | | | |
| 913 | 901, 902, 904 | 96, 97, 98, 99, 910, 911, 912, 913 | | | | |
| 99 | 901, 902 | 96, 98, 99, 910, 911, 912, 913 | | | | |
| 902 | — | 99, 910, 911, 913 | | | | |
| 911 | 902, 905 | 99, 910, 911, 913 | | | | 905 |
| 905 | — | 911 | | | | |

The result is that depth 1 neighbor cells of edge 97 are cells 903, 904, 96, 98, 910, 912, 913, that depth 2 neighbor cells of edge 97 are cells 902 and 911, and that depth 3 neighbor cell of edge 97 is cell 905 (Table 6).

Given the set of cells selected by the designer, and given the maximum depth value $p_{max}$, the previous algorithm yields the set of cells to imbed in the solving step (step S300 in FIG. 4).

Experiments have shown that $p_{max}=3$ is a good value in practice. Indeed, the resulting neighborhood is wide enough to provide a flexible behavior and small enough to provide a natural behavior.

Geometries sent to the solver are supports of theses cells. Coincident constraints are mapped on boundary links, if necessary. For example: when cell A is bounded by cell B then a coincident constraint is created between the support of cell A and the support of cell B. Plane-line coincident constraints are excluded because they are consequences of vertex-plane coincident constraints. Thanks to this process superfluous constraints are not sent to the solver. A "fix" constraint may furthermore possibly be set to all $p_{max}$ depth cells: this also contributes to prevent unexpected behavior beyond the area of interest.

The following is more specifically directed to the step of building new geometries according to motions returned by the solver and initial geometries (step S400 in FIG. 4), also called step of "rebuilding geometry".

The role of the solver is to compute motions of geometries so that constraints are satisfied. As said, these are mostly rigid motions in practice. The solver works from the displacements intended by the user and the geometries which are supports of the collected cells, that is, whose collected cells are the restrictions. It will be understood that said intended displacements may encompass either new positions and/or constraints, depending on solvers capability. Yet, information returned by the solver somehow amounts to new positions for the cell supports, i.e. the geometries.

The goal of the rebuilding step S400 described in this section is to apply the (rigid) motions returned by the solver to geometries and to rebuild supports of cells adjacent to moved cells. Because the relevant information might be retrieved from exploring the cell graph, the rebuilding step makes advantageously use of said graph.

For example, an edge E is shared by two (non tangent) faces A and B. Consequently, the support of edge E is the intersection line of plane supports of cells A and B. Assuming for instance that:

the support of cell B is involved in the solving process but not supports of cells E and A; and
the support plane of cell B is moved according to the solvers output;
then support line of cell E needs to be rebuilt as the intersection of modified plane B and unchanged plane A.

To achieve this, the main tasks of the algorithm might be designed as follows. Mark "out of date" all cells on the path of a cell to be moved. Apply rigid motions to all cells to be moved and mark them "up to date". Cells that are not "out of date" neither "up to date" are not modified by the solving process. They are "unchanged". Now, "out of date" cells must be rebuilt from "up to date" and "unchanged" cells. This starts by visiting the cell graph until one of these situations:

1. All the co-boundary cells of an "out of date" cell are "up to date" or "unchanged". Such an "out of date cell" cell is rebuilt by intersection of its co-boundary cells or by projection onto its co-boundary cells.

2. All the boundary cells of an "out of date" cell are "up to date" or "unchanged". Such an "out of date" cell is rebuilt by interpolating its boundary cells.

Situation 1 above includes the following cases.
An edge is the intersection if its two adjacent faces.
An edge is projected onto the support (plane or surface) of its unique adjacent face.
A vertex is the intersection of two edges on the same plane or surface.
A vertex is the intersection of three planes or surfaces.
A vertex is the intersection of an edge and a plane or surface.

Situation 2 above includes the following cases.
A line is the interpolation of its end vertices.
The planar support of a face is the interpolation of the coplanar vertices of its linear edges.

Accordingly, each time a geometry is rebuilt, a new search is preferably performed in order to find one of the two above situations until all "out of date" geometries are done.

As already evoked, the "collect" step S200 is designed in such a way that rebuilt is possible in a number of situations. Trivial situations allow for designing simple collect rules while more involved cases lead to designing more advanced rules. In particular, reverting to the last example, "collect" rules are designed in such a way that the iterative scan discussed systematically ends with all "out of date" cells rebuilt.

As a summary, the present invention allows for collecting local topology, e.g. local topological constraints, which provides a practical scheme for making response time proportional to the design change complexity and not to the whole solid complexity. Distant geometry is not involved in solving thus avoiding the risk of unexpected behavior. The relationships network does not need to be iso-constrained because the appropriate piece of modified geometry is sent to the solver. Besides, embodiments of the present invention allow the designer for using some of the best modeling technologies within a unified and seamless environment. In particular, since 3D shape creation is not limited to traditional manifold solids, the designer is free to trim and combine solids, surfaces and wires into a single object. Obviously, a wider range of objects can be investigated. Shape changes are easier since singularities are allowed. This results in a more creative conceptual design together with a shorten time to reach a goal. Saved time can be used to investigate alternate solutions. Furthermore, the possible use of 3D constraints brings precision to the conceptual design while maintaining flexibility since they can be created or removed where necessary. Importantly, the present invention is a history-free design, which makes the model easy to understand so that a late user can be involved in the project.

In addition, it should be noted that the present invention remains fully transparent to the end-user, and in particular does not require manually creating constraints, nor setting specific options or parameters, nor even needs to visualize the constraints which have been used.

In other words, the invention provides a more creative, easy to use, precise, flexible and fast conceptual design environment.

Finally, it is to be understood that the foregoing method can be applied to any object in any configuration capable of being defined by a CAD/CAM/CAE system, or any system used to display views of an object from varying viewpoints. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 10:
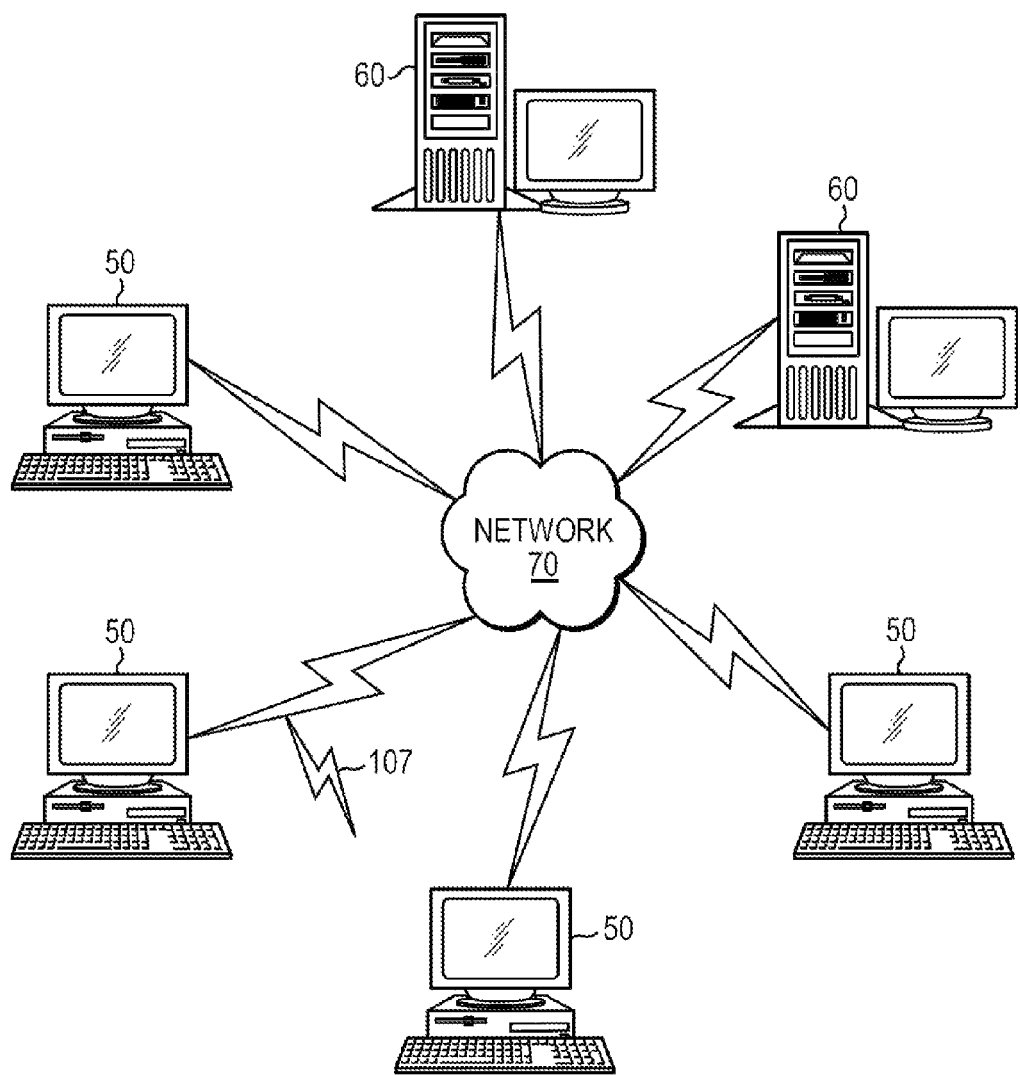
FIG. 10 is a schematic view of a computer network in which embodiments of the present invention may be implemented.

For non-limiting example, FIG. 10 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 11:
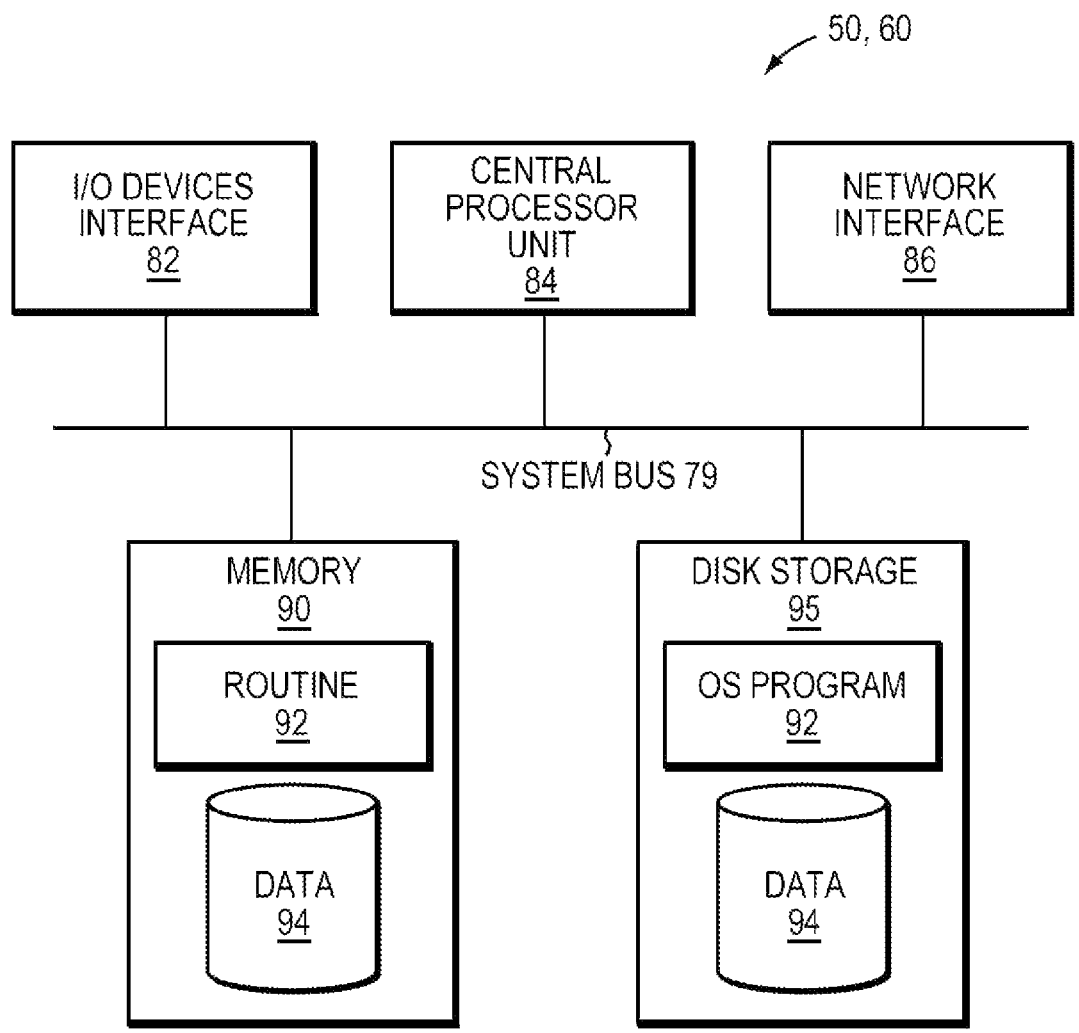
FIG. 11 is a block diagram of a computer node/device in FIG. 10.

FIG. 11 is a diagram of the internal structure of a computer (e.g., client processor/device 50 or server computers 60) in the computer system of FIG. 10. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 10). Memory 90 provides volatile storage for computer software instructions 92 and data 94 used to implement an embodiment of the present invention (e.g., interactive software code for editing a model of a 3D object, a solver, predefined rules, cell graph, and other computer-aided design components detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Accordingly, the invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory.

Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; CD-ROM and DVD disks, or a signal (such as a signal transmitted on the INTERNET). Any of the foregoing may be supplemented by, or incorporated in, specially designed ASICs (application-specific integrated circuits).

The preferred embodiments of the present invention have been described. It will however be understood that various modifications may be made without departing from the spirit and scope of the invention. Therefore, other implementations are within the scope of the following claims. For example, how the solver exactly computes motions to be applied to input geometries from the intended displacements indicated by the user depends on said solvers capabilities. Therefore, said intended displacement may be implemented as constraints and/or specification of new positions.

The teachings of all patents, published applications and references cited herein are incorporated by reference in their entirety.

What is claimed is:

1. A method of computer-aided design of a 3D object modeled by: (i) cells, the cells being restrictions of geometries of a model of the 3D object, and (ii) a cell graph comprising relations between the cells, which relations capture a topology of the model, the method comprising the steps of:
    editing an initial model by interacting with a user to identify intended displacements of initial geometries of the model, and selecting the cells which are restrictions of the geometries to be displaced;
    collecting cells adjacent to the selected cells according to the cell graph, some of the adjacent cells being excluded by predefined rules, wherein said predefined rules comprise at least one of sets of rules among (a) a set of rules limiting adjacency to a nth-order adjacent cell in the cell graph, and (b) a set of rules excluding, from said adjacent cells to be collected, any cell corresponding to a regular vertex bounding a collected cell;
    computing by a solver, transformations to be applied to initial geometries, from the intended displacements and geometries whose collected cells are restrictions thereof; and
    building new geometries according to said transformations and initial geometries.

2. The method of claim 1, wherein, at said collecting step, said set of rules limiting adjacency to a nth-order adjacent cell in the cell graph comprises limiting adjacency to a third-order adjacent cell in the cell graph.

3. The method of claim 1, wherein said collecting step comprises applying said set of rules excluding cells until self-consistency thereof is achieved.

4. The method of claim 1, wherein cells relate to vertices, edges and faces and the set of rules excluding cells comprises:
    for an input vertex: collecting faces bounded by said input vertex;
    for an input edge: collecting vertices bounding said input edge; and
    for an input face: collecting vertices bounding said input face, excluding regular vertices.

5. The method of claim 4, wherein the set of rules excluding cells further comprises:
    for an input vertex: collecting edges that are bounded by said input vertex and that are restrictions of a geometry being a non-linear curve;
    for an input face: collecting vertices bounding said input face, and that bound a face that is a restriction of a geometry being a non-planar surface, or that bound an edge which is a restriction of a geometry being a non-linear curve.

6. The method of claim 4, wherein the set of rules excluding cells further comprises:
    for an input cell linked to a constraint, collecting other cells linked to said constraint.

7. The method of claim 4, wherein the set of rules excluding cells further comprises:
    for an input vertex, as selected at the step of selecting, collecting the vertices that bound the faces bounding said input vertex; and
    for an input edge, as selected at the step of selecting, collecting the vertices that bound the faces bounding said input edge.

8. The method of claim 1, wherein the step of collecting further comprises:
    accessing the cell graph for translating topology shared by the geometries whose collected cells are restrictions thereof into coincidence constraints prior to sending said coincidence constraints to the solver for computing said transformations.

9. The method of claim 1, wherein at the step of editing, the intended displacements are at least partially encoded as constraints.

10. The method of claim 1, wherein the step of selecting the cells comprises:
    adding cells bounding the selected cells to the selected cells, prior to collecting.

11. The method of claim 1, wherein the step of building new geometries comprises accessing the cell graph.

12. A computer program product comprising: a non-transitory computer readable medium having computer useable program code embodied therewith,
    the computer usable program code when executed by a digital processor implements computer-aided design of a 3D object modeled by (i) cells, the cells being restrictions of geometries of a model of the 3D object, and (ii) a cell graph comprising relations between the cells, the relations capturing a topology of the model, the implementation including:
        editing an initial model by interacting with a user to identify intended displacements of initial geometries of the model, and selecting the cells which are restrictions of the geometries to be displaced;
        collecting cells adjacent to the selected cells according to the cell graph, some of the adjacent cells being excluded by predefined rules, wherein said predefined rules comprise at least one of sets of rules among (a) a set of rules limiting adjacency to a nth-order adjacent cell in the cell graph, and (b) a set of rules excluding, from said adjacent cells to be collected, any cell corresponding to a regular vertex bounding a collected cell;
        computing transformations to be applied to initial geometries, from the intended displacements and geometries whose collected cells are restrictions thereof; and
        building new geometries according to said transformations and initial geometries.

13. A computer system of computer-aided design of a 3D object modeled by: (i) cells, the cells being restrictions of geometries of a model of the 3D object, and (ii) a cell graph comprising relations between the cells, which relations capture a topology of the model, the system comprising:
- an initial model edited by computer interaction with a user to identify intended displacements of initial geometries of the model, and the edited initial model resulting in selected cells which are restrictions of the geometries to be displaced;
- processor means for collecting cells adjacent to the selected cells according to the cell graph, some of the adjacent cells being excluded by predefined rules, wherein said predefined rules comprise at least one of sets of rules among (a) a set of rules limiting adjacency to a nth-order adjacent cell in the cell graph, and (b) a set of rules excluding, from said adjacent cells to be collected, any cell corresponding to a regular vertex bounding a collected cell;
- a solver responsive to the processor means, the solver computing transformations to be applied to initial geometries, from the intended displacements and geometries whose collected cells are restrictions thereof; and
- computer model design means coupled to the solver and building new geometries according to said transformations and initial geometries.

14. A computer system as claimed in claim 13, wherein cells relate to vertices, edges and faces; and
the set of rules comprises any combination of:
- for an input vertex: collecting faces bounded by said input vertex;
- for an input edge: collecting vertices bounding said input edge;
- for an input face: collecting vertices bounding said input face, excluding regular vertices;
- for an input vertex: collecting edges that are bounded by said input vertex and that are restrictions of a geometry being a non-linear curve;
- for an input face: collecting vertices bounding said input face, and that bound a face that is a restriction of a geometry being a non-planar surface, or that bound an edge which is a restriction of a geometry being a non-linear curve;
- for an input cell linked to a constraint: collecting other cells linked to said constraint;
- for an input vertex: collecting the vertices that bound the faces bounding said input vertex; and
- for an input edge: collecting the vertices that bound the faces bounding said input edge.

15. A computer system as claimed in claim 13, wherein the processor means further:
accesses the cell graph for translating topology shared by the geometries whose collected cells are restrictions thereof into coincidence constraints prior to sending said coincidence constraints to the solver for computing said transformations.

16. A computer system as claimed in claim 13, wherein the computer model design means accesses the cell graph.

* * * * *